April 17, 1928.  1,666,310

J. ROBINSON

AUTOMATIC TRAIN PIPE COUPLING

Original Filed Nov. 24, 1920    2 Sheets-Sheet 1

April 17, 1928.                     1,666,310
J. ROBINSON
AUTOMATIC TRAIN PIPE COUPLING
Original Filed Nov. 24, 1920    2 Sheets-Sheet 2

INVENTOR
Joseph Robinson,
BY Watson, Tait,
Moore & Grindle,
ATTORNEYS.

Patented Apr. 17, 1928.

1,666,310

UNITED STATES PATENT OFFICE.

JOSEPH ROBINSON, OF NEW YORK, N. Y.

AUTOMATIC TRAIN-PIPE COUPLING.

Application filed November 24, 1920, Serial No. 426,176. Renewed May 2, 1925.

My invention relates to automatic train pipe couplings and has among its objects to provide a novel and improved support for such couplings in which the normal distance between the coupling head and the usual bracket may be varied by moving the head forward or backward relative to the bracket. Another object is to provide an adjustable abutment threaded to the supporting spring and cooperating therewith and with said bracket to extend and properly support the head.

These objects are attained by, and my invention consists in, the combinations, arrangements, and constructions hereinafter described, pointed out in the appended claims, and illustrated in the accompanying drawings in which—

Figure 1:
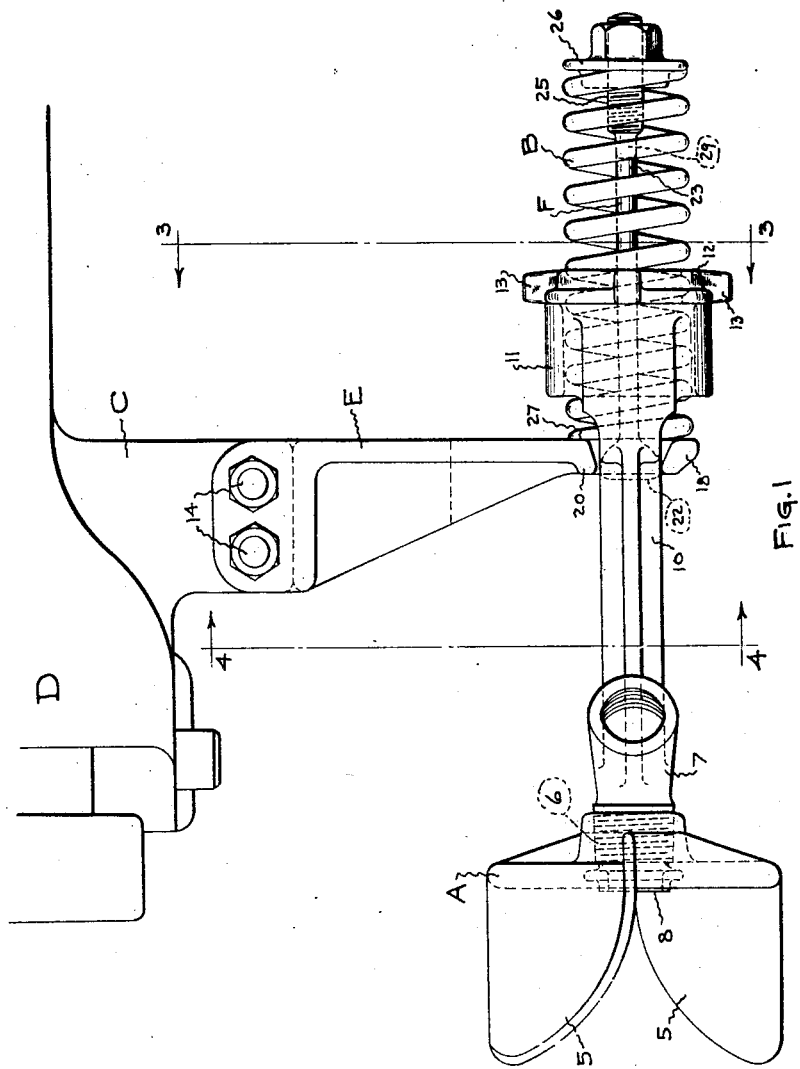
Figure 1 is a side elevation of my improvement.
Figure 3:
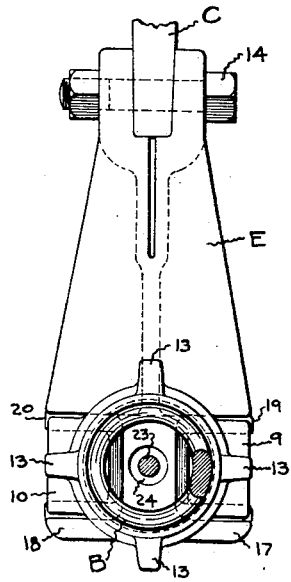
Figure 4:
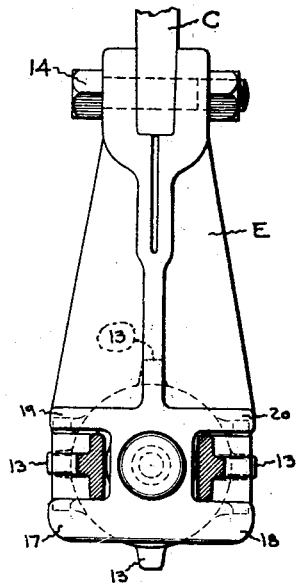

Figure 3 is a rear view of my improvement taken on the line 3—3 of Figure 1, and Figure 4 is a front view of the bracket of my improvement showing the members 9 and 10 as they would appear in section taken on the line 4—4 of Figure 1.

Figure 2:
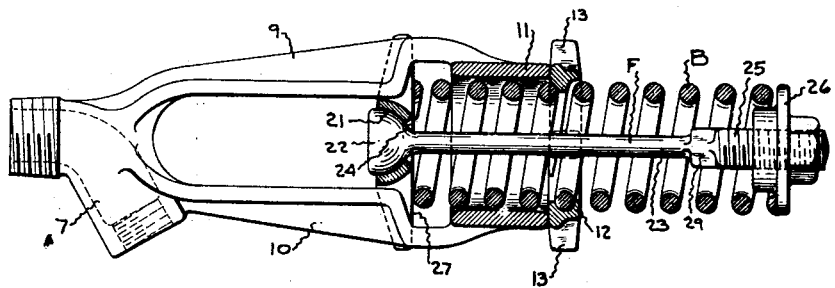
Figure 2 is a sectional plan view thereof with the coupling head omitted.

Referring now to the drawings: Any suitable coupling head A may be carried by my improved support. I prefer a head of the type shown, having guiding wings 5, and a centrally disposed port or opening threaded at 6 to receive the curved hollow fitting or conduit 7 of my improvement, and suitably carrying at its forward end, in the plane of the face of the coupling head, a gasket 8. A pair of spaced members or straps 9 and 10 lying preferably in the horizontal plane, terminate at their forward end in the aforesaid fitting or conduit 7, and at their rear end in a ring or collar 11, which loosely surrounds and slides upon the buffer spring B, though the straps 9 and 10 may, of course, be formed separately of the conduit and the collar if desired. Abutting the collar 11, and screwed on or threaded to the buffer spring B, I provide a nut or abutment 12, having ears or projections 13, as shown particularly in Figure 2. This arrangement provides a construction in which the spring B is compressed, when the collar 11 contacts with the nut 12, as mating heads couple up in service, and in which limited longitudinal movement of the coupling head A independently of movement of the spring B is permitted.

Suitably connected, as by bolts 14, to the usual lug C of the car coupler D, I provide a bracket or base E the lower end of which, viewed from the front or rear, has the general outline of a capital I. The lower cross of the I forms bearings or trunnions 17 and 18 upon which the members 9 and 10 ride and by which, in cooperation with the portions 19 and 20 of the upper cross of the I, they are positioned relative to and are supported on the bracket E. In this manner the proper positioning of these parts, and of the coupling head A, with respect to the bracket, is efficiently effected. Upon the middle section of the I-shaped portion of the bracket, I provide a concave socket 21, as shown especially in Figure 2, and in this I mount for rocking movement therein, the convex head 22 of a pivot device F.

A shank 23, integral with the convex head 22, extends through the opening 24 in the aforesaid socket, and in the said bracket E, and through the spring B to the rear thereof and is there provided with a threaded portion 25. Upon this threaded portion an abutment or stop 26 is adjustably mounted and serves to maintain the buffer spring B in position with respect to the pivot device F, and to place the spring under compression with its forward end firmly pressed against the rear face 27 of the bracket E. The spring is pressed against the bracket with sufficient force to prevent the forward end sliding up or down unduly on the bracket when the coupling head rocks upon the trunnions 17 and 18 as when coupling on uneven track. This angling of the coupling head causes the pivot device F to rock in the socket 21 carrying with it the buffer spring B, but rearward movement of the head forces the collar 11 into contact with the nut 12 and places the spring under the required service compression.

This arrangement produces an improved support in which the distance between the coupling head A and the bracket E may be readily varied to compensate for the wear occurring on the car coupler knuckles, or the train pipe coupling, in service, and in which the coupling head A is yieldingly supported for universal movement relative to the bracket E. To vary the distance between the coupling head and the bracket and thus compensate for the wear aforesaid, it is but necessary to rotate the nut 12, through the medium of its ears or projections 13, formed integral with the nut, to the desired extent. This operation will cause the coupling head A to move forward or permit its being moved backward according to the direction in which the nut is rotated. Rotation of the pivot device F, when the stop 26 is being assembled or adjusted along the shank 23, is prevented by embracing the rectangularly shaped portion 29 of the shank with a suitable wrench, the coils of the spring B being, of course, spaced a sufficient distance apart to permit of the ready insertion of this wrench therebetween, and so as to give to the spring the correct and proper design for the purpose intended.

What I claim is:

1. In an automatic train pipe coupling, the combination with a coupling head and a supporting bracket therefor, of a spring for extending the head, and means to permit limited longitudinal movement of said head toward and from the bracket without movement of the spring.

2. In an automatic train pipe coupling, the combination with a coupling head and a supporting bracket therefor, of a spring for extending said coupling head, an abutment on said spring, and means supported by said bracket and adapted to slide along the spring to permit limited longitudinal movement of said head independently of movement of the spring.

3. In an automatic train pipe coupling, the combination with a coupling head and a supporting bracket therefor, of a spring to extend said coupling head, an abutment mounted on said spring for adjustment along the spring, and means connected with said head and supported by said bracket for sliding movement on said spring between said abutment and said bracket to permit longitudinal movement of said coupling head independently of movement of said spring.

4. In an automatic train pipe coupling, the combination with a coupling head and a supporting bracket therefor, of a spring to extend said coupling head, an abutment mounted on said spring for adjustment along the spring, and means connected with said head and supported by said bracket for sliding movement on said spring between said abutment and said bracket to permit longitudinal movement of said coupling head independently of movement of said spring, said means comprising a member connected with said coupling head and extending rearwardly thereof to the rear of said bracket and carrying thereat a collar which surrounds said spring.

5. In an automatic train pipe coupling, the combination with a coupling head and a supporting bracket therefor, of a spring to project said coupling head forward of said bracket, and means for varying the distance between said head and said bracket, said means comprising a member slidable along said spring, and a device adjustably connected to the spring, said device being independent of said member.

6. In an automatic train pipe coupling, the combination with a coupling head and a supporting bracket therefor, of a member connected with said head and extending to the rear of said bracket, a spring between said member and said bracket to project said coupling head forward of the bracket, and a nut threaded to said spring for varying the distance between said bracket and said head, said nut being independent of said member.

7. In an automatic train pipe coupling, the combination with a coupling head and a supporting bracket therefor, of means for projecting said coupling head forward of said bracket and for varying the extent of such projection, said means comprising a member extending from said coupling head to the rear of said bracket, and a device threaded to said spring and adapted to abut said member, said device being separate of and disconnected from said member.

8. In an automatic train pipe coupling, the combination of a coupling head, a supporting bracket, a universal joint carried by said bracket for permitting universal movement to said coupling head, said joint comprising a device pivotally mounted on said bracket and extending rearwardly thereof, a member connected with said head and extending therefrom past said bracket and terminating thereat in a perforated portion, an abutment mounted upon the rear end of said pivot device, a spring extending into said perforated portion and surrounding said pivot device and bearing upon said abutment, and a stop against which said member abuts, said stop being mounted on said spring for adjustment along the spring relative to and independently of said member.

9. In an automatic train pipe coupling, the combination of a coupling head, a member rigidly connected to said head and having an opening therein, a spring mounted in said opening and serving to support said head, the opening being free of obstruction to the free movement of said spring longitudinally in said opening, and means to adjust said member along said spring.

10. In an automatic train pipe coupling, the combination of a coupling head suspended from a car coupler, a member rigidly connected to said head and having supporting relation to said head and being provided with an opening, a spiral spring extending into said opening and acting to yieldingly sustain said head, said opening being free of obstruction to longitudinal movement of said spring therein, and means to adjust said member along said spring.

11. In an automatic train pipe coupling, the combination of a coupling head and bracket, a member connected to said head for supporting the same on said bracket, said member having an opening therein at the rear of the bracket, a spring mounted in said opening and bearing against said bracket and serving to support said head, said opening being free of obstruction to the free movement of said spring longitudinally in said opening, and means associated with said spring for moving said coupling head forward from its original position without rotating said spring in its opening.

12. In an automatic train pipe connector, the combination of a bracket, a coiled spring arranged at the rear side of the bracket and having its front end bearing against the bracket, a collar surrounding said spring and freely movable relative thereto, an abutment adjustably mounted on said spring for contacting with said collar, a coupling head arranged in front of said bracket and means for rigidly connecting said head with said collar.

13. In an automatic train pipe connector, in combination, a bracket, a coiled spring arranged at the rear of said bracket and having its front end bearing against said bracket, a collar surrounding said spring and freely movable relative thereto, an abutment for said collar mounted on said spring, arms connected to said collar and projecting forwardly past said bracket and a coupling head secured to said arms.

In testimony whereof I hereby affix my signature.

JOSEPH ROBINSON.